(No Model.)
L. GUTMANN.
ELECTRIC CONVERSION SYSTEM.
No. 530,178. Patented Dec. 4, 1894.
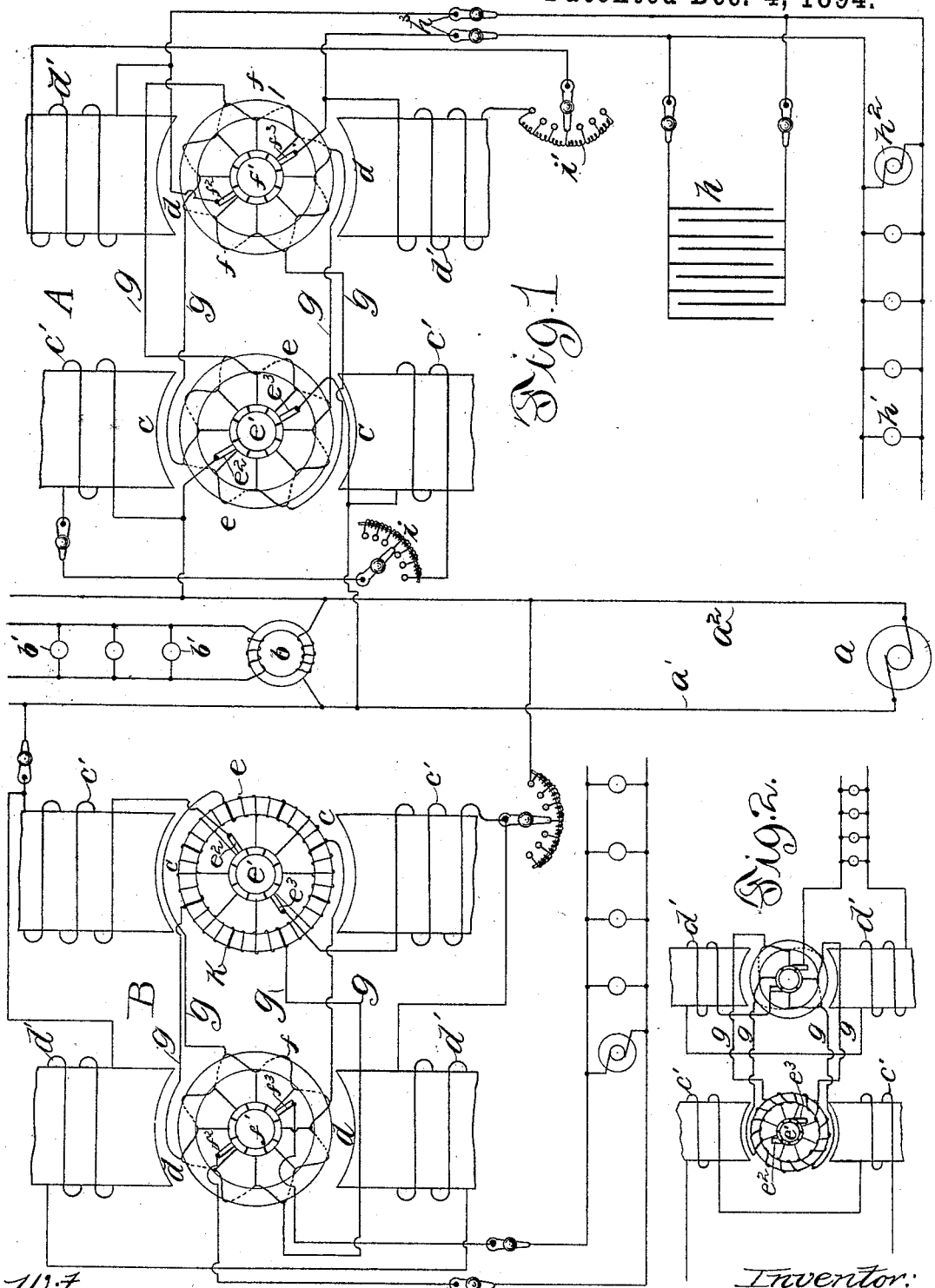

UNITED STATES PATENT OFFICE.

LUDWIG GUTMANN, OF PITTSBURG, PENNSYLVANIA.

ELECTRIC CONVERSION SYSTEM.

SPECIFICATION forming part of Letters Patent No. 530,178, dated December 4, 1894.

Application filed December 23, 1891. Serial No. 415,976. (No model.)

*To all whom it may concern:*

Be it known that I, LUDWIG GUTMANN, a subject of the Emperor of Germany, and a resident of Pittsburg, in the county of Allegheny and State of Pennsylvania, have invented certain new and useful Improvements in Electrical Conversion Systems, (Case 58,) of which the following is a specification.

My invention relates to a system of electrical distribution, and its object is to supply to alternating and constant current translating devices electrical energy derived from a source of alternating currents.

In an application, Serial No. 415,975, I have described a self starting harmoniously running motor adapted to run under the influence of single phase alternating currents, two armature windings being provided, in one of which are produced biphase or polyphase currents which react upon a magnetic field to maintain the rotation. In the present invention I utilize said motor as a motor-generator by commutating the biphase or polyphase currents, and passing the continuous current thus produced through a working circuit containing translating devices. If the supplemental winding be directly connected with the main winding the constant current produced will have the potential of the supplied alternating current, while if the supplemental winding be connected with a secondary main winding, the potential may be transformed up or down as desired. Instead of providing a secondary winding the potential may be transformed by connecting as an induction motor.

My invention will be more readily understood by reference to the accompanying drawings, in which—

Figure 1 illustrates diagrammatically a system of distribution embodying my invention. Fig. 2 illustrates a modified form of the motor generator.

Like letters refer to like parts in both the figures.

The source of alternating currents $a$ is connected by the mains $a'$ $a^2$ with the several consumption circuits. The primary of the converter $b$ is shown connected between the mains $a'$ $a^2$, translating devices $b'$ $b'$ being included in the secondary of the converter, and, in consequence, being supplied with an alternating current.

The motor generator A is provided with two magnetic fields $c$ and $d$, a main armature winding $e$ being adapted to rotate in the field $c$, while a supplemental winding $f$ is adapted to rotate in the field $d$, the two windings being mechanically connected and rotatable together. The motor is of the shunt type, the field coils $c'$ being connected in parallel with the armature, the coils of which are connected with the segments of a commutator $e'$ upon which rest the brushes $e^2$ $e^3$. The coils of the main winding $e$ are connected with the coils of the supplemental winding $f$ by means of conductors $g$, shown extending between the centers of the coils, but which may extend between any intermediate points of the coils. The coils of the supplemental winding are connected with the segments of commutator $f'$ upon which rest brushes $f^2$ $f^3$ to which are connected the opposite sides of the consumption circuit containing the translating devices, as for instance, storage battery $h$, lamps $h'$ and motor $h^2$. Switches $h^3$ may be provided so that the consumption circuit may be disconnected from the motor-generator and the translating devices supplied by the charged storage battery. The field coils $d'$ are connected in shunt with the working circuit, the field being thus a constant one. Rheostats $i$ $i'$ are included in the field coil circuits for the purpose of regulation, the rheostat $i$ being preferably an inductive one.

The alternating current traversing the main armature winding reacts upon the field $c$ to produce rotation, the motor-generator thus starting from rest. When normal speed has been attained the currents from the main winding periodically and successively traverse the coils of the supplemental winding in harmony with the alterations to produce biphase currents, and, in consequence, a rotary field, the biphase currents being then commutated, and a portion of the constant current thus produced traverses the field coils $d'$ to produce a magnetic field which reacts upon the rotary field to maintain synchronous rotation.

The motor generator B is of the series type, the field coils being connected in series with the armature, the supplemental field being in this case also excited by the alternating current, the field $d$ being in consequence an alternating one instead of constant as in motor-generator A. The field coils of the two fields are shown connected in parallel but they may be connected in series. A secondary winding $k$ is provided in addition to the winding $e$, being connected therewith only in inductive relation, the secondary winding being indicated by heavy lines; while the main winding is indicated by light lines. The secondary winding is connected with the supplemental winding $f$ by means of conductors $g$ in the same manner as the main winding in motor-generator A. The working circuit containing the translating devices is connected with the brushes $f^2 f^3$. The motor-generator B will thus be of the step down type since the main winding $e$ has more coils than the secondary winding $k$. Were the reverse the case it would be of the step up type. The constant current supplied by motor-generator B is in consequence of a less voltage than the alternating current.

In Fig. 2 is shown a motor generator of the induction type, the main armature winding not being in electrical connection with the source of alternating currents, the currents traversing the same being produced wholly by induction. In this type, a voltage upon the consumption circuit higher or lower than that upon the feeding circuit may be obtained by proper adjustment of the number of turns in the main armature winding, no secondary armature winding, like that shown in motor generator B, being necessary. The field coils $c'$ are traversed by the alternating current. A pair of short-circuiting brushes $e^2 e^3$ rest upon the commutator $e'$. The field coils $d'$ are connected with the consumption circuit in series, the motor generator being thus self-regulating and maintaining a constant voltage upon the consumption circuit. If, for instance, the motor-generator is running with a certain load, that is, with a certain current flowing in the consumption circuit, and more lamps in parallel are cut in, thus decreasing the resistance of the circuit, more current will flow through the consumption circuit; but the decrease of external resistance causes a decrease of voltage at the brushes feeding the consumption circuit, and, further, an increased current flowing, the drop on the consumption circuit between the brushes and the translating devices is greater, so that the voltage to which the translating devices are subjected is decreased for these two causes; but, the field coils $d'$ being in series with the consumption circuit, an increased current traverses the same, thus increasing the supplemental field strength, thereby inducing in the supplemental winding an electro-motive force which is added to the voltage of the main winding to increase the voltage at the brushes and compensate for the drop caused by the decrease of resistance and increased current flow.

In the present application the claims are to be construed as referring to a motor-generator and not to a motor so that the terms "translating devices" and "consumption circuit" refer to translating devices and consumption circuits external to the machine itself. In the application hereinbefore referred to, a motor operating upon the principle of the motor generator disclosed herein is described, and the claims herein are not to be construed as covering said construction, but limited instead to a motor-generator adapted to supply current to translating devices in consumption circuits external to the machine.

It is evident that my invention is susceptible of various modifications, and I do not, therefore, limit myself to precise constructions, but Having described my invention, what I claim as new, and desire to secure by Letters Patent, is—

1. The method of distributing electrical energy to translating devices, which consists in generating single phase alternating currents, transmitting the same to the point of consumption producing from said currents biphase or polyphase currents, commutating said biphase or polyphase currents, and passing the continuous current thus produced through translating devices in local consumption circuits.

2. The method of distributing electrical energy, which consists in generating single phase alternating currents, distributing the same as high tension currents to sub-stations, locally transforming the same into biphase or polyphase currents of lower voltage, commutating said biphase or polyphase currents, and distributing the same to the consumption circuits.

3. The method of distributing electrical energy from an alternating current generator to both continuous current and alternating current translating devices, which consists in generating single phase alternating currents, transmitting the same to the points of consumption, passing a portion of said current through circuits adapted to feed alternating current translating devices, transforming another portion of said current into biphase or polyphase currents, and then into continuous currents, and passing said continuous currents through circuits adapted to feed continuous current translating devices, substantially as described.

4. The combination with a single phase alternating current generator, of a self-starting synchronous motor-generator in circuit therewith, a commutator for commutating the currents from said motor-generator, and translating devices in local consumption circuits fed by said commutated current, substantially as described.

5. The combination with a single phase alternating current generator, of a self-starting synchronous motor-generator in circuit therewith, means for increasing or decreasing the voltage, a commutator for commutating the currents from said motor-generator, and translating devices in local consumption circuits fed by said commutated current, substantially as described.

6. The combination with a single phase alternating current generator, of a motor-generator comprising an armature winding adapted to be rotated through the influence of the current from said generator, supplemental circuits through which said alternating currents are adapted to be successively and periodically passed to produce biphase or polyphase currents, a field magnet adapted to react upon the conductors carrying said bi or polyphase currents, a commutator for commutating said bi or polyphase currents, and translating devices in local consumption circuits adapted to be traversed by said commutated currents.

7. The combination with a single phase alternating current generator, of a motor generator comprising an armature winding adapted to be rotated through the influence of the current from said generator, supplemental circuits through which said currents are adapted to successively and periodically pass to produce biphase or polyhase currents, a field magnet adapted to react upon the conductors carrying said biphase or polyphase currents, a commutator for commutating said biphase or polyphase currents, and translating devices in local consumption circuits adapted to be traversed by said commutated currents, the coils exciting said field magnet being included in series with said consumption circuits, substantially as described.

8. In a system of electrical distribution, the combination with continuous current translating devices and alternating current translating devices, of an alternating current generator supplying energy to both sets of translating devices, means interposed between the generator and the alternating current translating devices for adapting the potential of the current to the translating devices, and means interposed between the generator and said continuous current translating devices for adapting the potential of the current to the translating devices and changing the current from single phase to biphase or polyphase and then into continuous currents, whereby both alternating and continuous current translating devices may be supplied from the same current source, substantially as described.

9. The combination with a single phase alternating current generator, of a transformer adapted to convert said single phase currents into biphase or polyphase currents and then into continuous currents, a storage battery adapted to be traversed by said continuous current, and translating devices adapted to be connected in circuit with said storage battery.

10. The method of producing a continuous current from a single phase alternating current, which consists in establishing in an armature winding alternating currents, splitting said currents, and transmitting the split currents periodically through sub-circuit as biphase or polyphase currents, and commutating said biphase or polyphase currents, substantially as described.

11. The method of producing a biphase or polyphase current from a single phase alternating current, which consists in establishing in an armature winding alternating currents, splitting said currents and transmitting the split currents periodically through successively arranged sub-circuits to form a system of biphase or polyphase currents, substantially as described.

12. The combination with a field magnet, of an armature adapted to be rotated in the field of said magnet, said armature being provided with a primary main winding and a secondary main winding in inductive relation thereto, and a supplemental winding, the coils of which are connected in circuit with said secondary main winding, substantially as described.

In testimony that I claim the foregoing as my invention I have signed my name, in presence of two witnesses, this 15th day of December, 1891.

LUDWIG GUTMANN.

Witnesses:
  CECIL P. POOLE,
  JOHN W. HARVEY.